United States Patent [19]

Brown et al.

[11] Patent Number: 5,481,141
[45] Date of Patent: Jan. 2, 1996

[54] POTENTIOMETER INCLUDING A PLURALITY OF RESISTIVE ELEMENTS

[75] Inventors: Richard L. Brown, Pekin; Maurice J. Dust, Peoria, both of Ill.

[73] Assignee: Caterpillar Inc., Peoria, Ill.

[21] Appl. No.: 86,779

[22] Filed: Jul. 1, 1993

[51] Int. Cl.⁶ ............................ F02D 11/10; H01C 10/00
[52] U.S. Cl. ........................ 307/106; 123/399; 123/494
[58] Field of Search .................. 74/513, 514, 512, 74/560; 123/494, 399, 361, 357; 340/870.38; 338/108, 153; 29/832; 174/250, 255, 260; 361/748, 760, 784, 790, 735, 744

[56] References Cited

U.S. PATENT DOCUMENTS 4,405,971  9/1983  Ohsawa ............................ 361/401
4,915,075  4/1990  Brown .............................. 123/399

Primary Examiner—Peter S. Wong
Assistant Examiner—Aditya Krishnan
Attorney, Agent, or Firm—R. Carl Wilbur

[57] ABSTRACT

Pedal mounted sensors are useful in vehicles for delivering an electrical signal correlative to the position of the pedal position. A pulse-width-modulated signals is preferable because it is less susceptible to signal degradation from engine noise or other factors. A pedal mount sensor capable of measuring a plurality of different angle ranges is disclosed. A stationary portion of the potentiometer includes both a mother board and a daughter board to improve manufacturability of the potentiometer. An application specific integrated circuit is substituted for direct pulse-width-modulation circuitry that permits a second, redundant circuit to be included within the potentiometer housing.

11 Claims, 4 Drawing Sheets

PRIOR ART

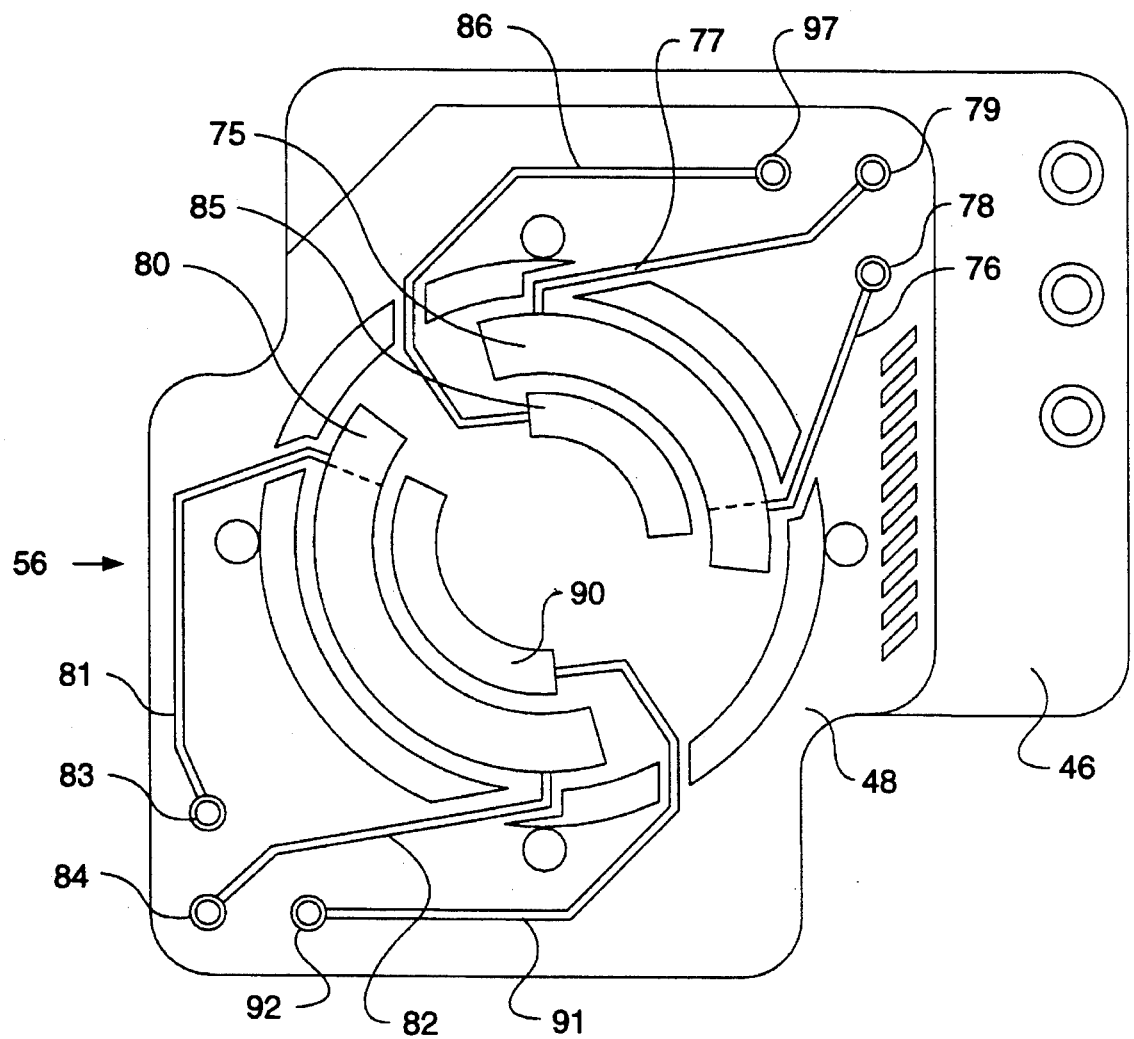

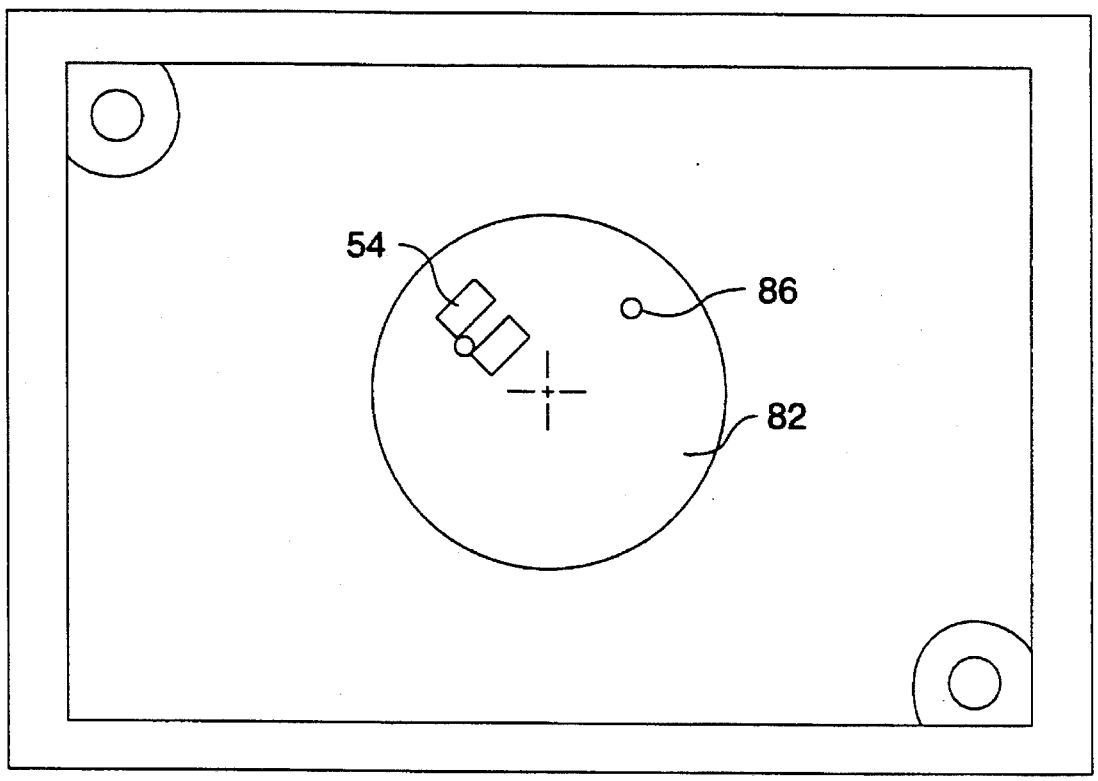

POTENTIOMETER INCLUDING A PLURALITY OF RESISTIVE ELEMENTS

TECHNICAL FIELD OF THE INVENTION

The present invention relates generally to potentiometers and, more particularly, to a potentiometer with a plurality of resistive elements on a printed circuit board.

BACKGROUND OF THE INVENTION

It is known in the art of position sensors to use a potentiometer to produce an output signal that is a function of the position of a particular component. For example, U.S. Pat. No. 4,915,075 (the '075 patent) describes a potentiometer used as an accelerator pedal position sensor. The '075 patent discloses a potentiometer having a movable wiper in contact with a stationary portion. The stationary portion includes a two sided circuit board, one side of which includes a resistive strip and a conductive strip. The other side includes discrete pulse-width-modulation conditioning circuitry that converts the analog potentiometer signal into a pulse-width-modulated signal which is a function of the accelerator pedal position.

The position sensor disclosed in the '075 patent has advantages over prior art accelerator pedal position sensors, but it also has several drawbacks. One drawback involves the manufacture of a printed circuit board that includes a resistive strip. The manufacturing process for making the resistive strip sometimes conflicts with the manufacturing processes for a printed circuit board, and may degrade the electrical runs on the printed circuit board and cause the board to fail. It would be preferable to develop a printed circuit board such that the manufacturing process for the resistive strip does not damage the printed circuit board.

A further drawback of the position sensor disclosed in the '075 patent is the relatively large amount of space required by the discrete pulse-width-modulation conditioning circuitry. It would be preferable to implement conditioning circuitry that requires less space.

Most position sensors are designed to function over a specific range of angles. Because the resistive element of the '075 patent is fixed on the circuit board, the potentiometer can measure a maximum angle determined by the arc of the resistive element. The potentiometer may not be used in applications requiring the measurement of angles larger than that maximum. It would be preferable to use a potentiometer having a plurality of such maximum angles, where the maximum angle could be selected according to the specific application.

The present invention is directed toward overcoming one or more of these drawbacks.

SUMMARY OF THE INVENTION

A device for generating a pulse-width-modulated signal corresponding to a position of a movable mechanical member is disclosed. The device has a potentiometer with a movable wiper and a stationary portion, wherein the stationary portion includes a mother board and a daughter board. A conditioning circuit is positioned on the mother board, the conditioning circuit being electrically connected to the daughter board and adapted to produce a pulse-width-modulated signal responsive to a position of the movable wiper on the stationary portion. In one aspect of the present invention, the daughter board includes at least two resistive elements.

In another aspect of the present invention, a signal generating device for delivering a pulse-width-modulated signal responsive to the position of a movable mechanical member is disclosed. The device includes a circuit board having a first and a second side and a potentiometer having a movable wiper and a stationary portion, wherein the stationary portion includes the circuit board second side. The second side of the circuit board includes at least two resistive elements with the movable wipers being in movable contact with the stationary portion of the potentiometer. A conditioning circuit is included on the first side of the circuit board, wherein the conditioning circuit is electrically connected to at least one of said resistive elements.

These and other aspects of the present invention will become apparent upon reading the detailed description of the preferred embodiment in conjunction with the drawings and appended claims.

DESCRIPTION OF THE DRAWINGS

FIG. 3 illustrates the daughter board mounted on the mother board in a preferred embodiment of the present invention.

FIG. 4 is a diagrammatic sectional partial view taken along line IV—IV of FIG. 2.

DETAILED DESCRIPTION OF THE PREFERRED EMBODIMENT

While the present invention will be described with respect to use of the potentiometer on an accelerator pedal, it is readily apparent that the potentiometer device disclosed herein could be used in many other applications.

U.S. Pat. No. 4,915,075 issued to Brown discloses a potentiometer device including a circuit board with discrete pulse-width-modulation conditioning circuitry on a first side and a resistive element on a second side. A complete description of such a device can be found in the disclosure of the Brown patent. The present invention also relates to a potentiometer having a pulse-width-modulated output signal.

Figure 1:
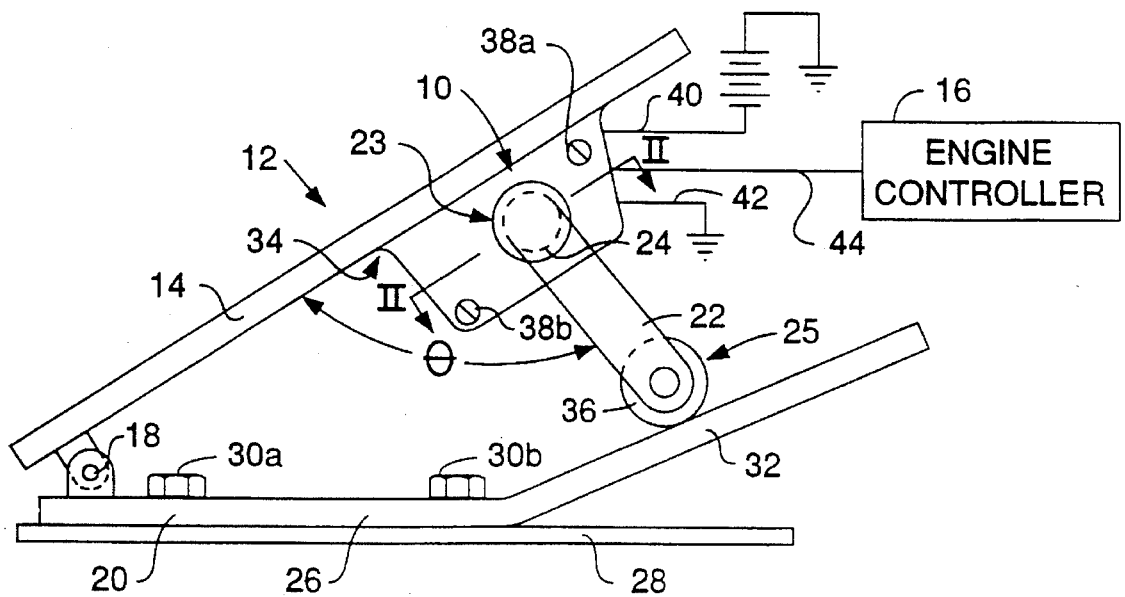
FIG. 1 is a diagrammatic side view of a pedal mounted sensor adapted to deliver a signal in response to the position of the pedal.

FIG. 1 illustrates the relationship between an accelerator pedal unit 12 of a work vehicle (not shown) and a signal generating apparatus 10. The signal generating apparatus 10 produces a pulse-width-modulated signal having a duty factor responsive to the position of the pedal 14, and delivers the signal to an engine controller 16. The pedal 14 is illustrative and the signal generating apparatus 10 can be adapted for use with other movable mechanical members. In a preferred embodiment the accelerator pedal unit 12 is a series WM-516 manufactured by Williams Precision Controls of Portland, Oreg., and includes the pedal 14, a hinge 18, a baseplate 20, a lever 22, and a pin 24. The base plate 20 has a horizontal portion 26 rigidly attached to the vehicle frame 28 by anchor bolts 30a, 30b, for example. The base plate 20 further includes an angled portion 32 which is fixed relative to the vehicle frame 28. The pedal 14 is pivotally movable about the hinge 18 relative to the work vehicle frame 28. Preferably the hinge 18 can be positioned on the base plate horizontal portion 26 as shown; however, the hinge 18 can also be rigidly attached to the vehicle frame 28.

The pedal 14 is movable between a first position corresponding to engine idle speed and a second position corresponding to maximum engine speed. A pedal return spring (not shown) biases the pedal 14 to the first position. The pin 24 is positioned on the pedal lower portion 34 and is rotatable relative to and in response to pivotal movement of the pedal 14 by the lever 22. The lever 22 has first and second end portions 23,25. The lever first end portion 23 is fixedly connected to the pin 24 and the lever second end portion 25 includes a roller 36 in contact with and movable along the base plate angled portion 32 in response to movement of the pedal 14.

In a preferred embodiment, a pair of connecting bolts 38a, 38b are used to attach the signal generating apparatus 10 to the pedal 14. However, it is foreseeable to accomplish this connecting function using adhesives or other fasteners. The signal generating apparatus 10 is electrically connected to a source of positive battery voltage, to ground, and to the engine controller 16 by respective wires 40, 42, and 44.

Figure 2:
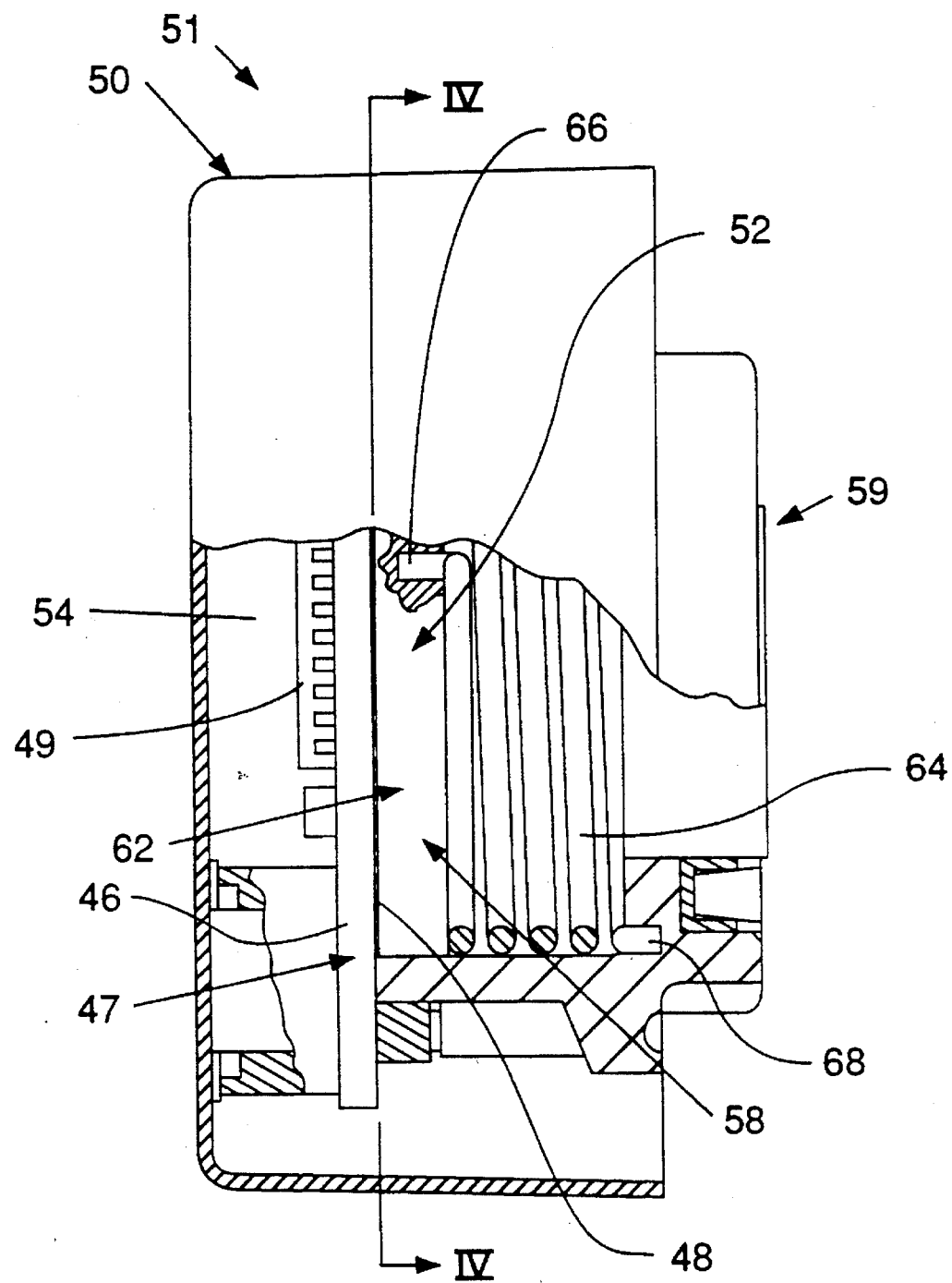
FIG. 2 is a diagrammatic sectional partial view taken along line II—II of FIG. 1.

Referring now to FIG. 2, the potentiometer 51 of signal generating apparatus 10 is shown. A circuit board 47 within the housing 50 includes a mother board 46 and daughter board 48. Pulse-width-modulation conditioning circuitry 49 is included on one side of the mother board 46. In a preferred embodiment, the daughter board 48 lays flat against the mother board 46 on the side of the mother board 46 that is opposite the pulse-width-modulation conditioning circuitry 49. The daughter board 48 is electrically connected to the mother board 46 through connectors (not shown in FIG. 2).

FIG. 3 shows the daughter board 48 mounted on the mother board 46. In the preferred embodiment, the daughter board includes two resistive elements 75, 80 and two conductive elements 85, 90 respectively to form part of a stationary portion 56 of the potentiometer 51. The first resistive element 75 subtends an arcuate angle of approximately 72 degrees, while the second resistive element 80 subtends an arcuate angle of approximately 100 degrees. The daughter board of the preferred embodiment can be oriented in one of two positions corresponding to the particular resistive element/conductive element pair that is to be used in a particular application. As shown in FIG. 3, the daughter board is mounted in a first position so that the potentiometer 51 will measure angles up to seventy-two degrees. However, the daughter board 48 can be mounted in a second position (not shown) by rotating the daughter board 48 approximately one hundred and eighty degrees from the first position about an axis perpendicular to the plane formed by the mother board 46. The potentiometer 51 will measure angles up to about one hundred degrees with the daughter board 48 mounted in the second position. Although the preferred embodiment is described with respect to resistive strips spanning one hundred degrees and seventy-two degrees it should be appreciated that those two values can be readily and easily modified. Also, although the preferred embodiment includes two resistive elements, it could be easily modified to include more than two elements. Thus, one skilled in the art could easily modify the preferred embodiment to measure other angles or to include more than two resistive elements without deviating from the scope of the invention.

Electrical runs 76, 77 are connected to the first resistive element 75 and connectors 18, 19. Likewise, electrical runs 81, 82 are connected to the second resistive element 80 and connectors 83, 84. An electrical run 86 is connected to the first conductive element 85 and a connector 97. Likewise, an electrical run 91 is connected to the second conductive element 90 and a connector 92. When the daughter board is mounted in a first position, as shown in FIG. 3, connectors 78, 79, and 97 are electrically connected to the pulse-width-modulation conditioning circuitry 49 on the mother board 46. The connectors 83, 84, and 92 associated with the second resistive element 80 and the second conductive element 90 are not connected with the mother board 46 in the first position. When the daughter board 48 is mounted in the second position (not shown), connectors 83, 84, and 92 are electrically connected with the pulse-width-modulation conditioning circuitry 49 on the mother board 46, and connectors 78, 79, and 97 are unconnected.

Referring to FIG. 3, the resistive element 75 and the electrical connections to the pulse-width-modulation circuit 49 through connectors 78, 79, and 97 will be described with reference to the daughter board 48 mounted in the first position. It will be recognized that the following description is identical for the daughter board 48 mounted in the second position.

When in the first position, the pulse-width-modulation conditioning circuitry 49 applies a first potential voltage source to resistive element 75 at the connector 79, and a higher potential second voltage source at connector 78 through respective electrical runs 77, 76. Referring to FIG. 4, a rotatable portion of the potentiometer is shown. The movable wiper 54 is in movable contact with the stationary resistive element 75 and conductive element 85. Because the movable wiper 54 is of negligible resistance it effectively forms a short circuit from the resistive strip 75 to the conductive strip 85. Thus, the entire conductive strip 85 is maintained at DC voltage potential correlative to the position of the movable wiper 54 on the resistive strip 75. Although the present embodiment uses resistive strips, one skilled in the art will recognize that these strips could be replaced, for example, by a variable capacitance or inductance devices without departing from the scope of the invention.

Furthermore, although the present invention has been described in relation to a circuit board comprised of a mother board 46 and a daughter board 48, it should be recognized that the plurality of resistive elements may also be placed directly on a reverse side of a printed circuit board.

Referring to FIG. 2, a housing 50 is of sufficient size to contain the conditioning circuit 49, the mother board 46, the daughter board 48, and the potentiometer 51. In the preferred embodiment, the housing 50 is constructed of polyetherimide, but the housing 50 could be formed from numerous other materials. An epoxy resin 54 between the housing 50 and the mother board 46 hermetically seals the conditioning circuit 49, mother board 46, the daughter board 48, and potentiometer 51 within the housing 50. The housing 50 and epoxy resin 54 support the circuitry and protect against possible malfunctions such as short circuits and broken wires within the signal generating apparatus 10.

The housing 50 includes a molded rotor 58 having a first end 59 integrally engaging and movable with the pin 24, shown in FIG. 1, and a second end 62 fixedly connected to the movable wiper 54. Thus, when the pin 24 rotates, the movable wiper 54 moves along the resistive strip 75 causing the potentiometer 51 to deliver a DC voltage correlative to the position of the pin 24. The molded rotor 58 can be constructed of any one of numerous nonconductive materials but is preferably polyetherimide. A return spring 64 has a first end 66 connected to the molded rotor second end 62 and a second end 68 connected to the housing 50, and is adapted to bias the molded rotor 52 to a preselected position.

Pulse-width-modulation circuitry is common in the industry and therefore the circuitry will not be described. U.S. Pat. No. 4,915,075 discloses a block diagram of suitable circuitry. A preferred embodiment of that conditioning circuit includes a square wave generator, an integrator, a comparator and other discrete circuitry. The combination of all of the discrete components required for such a circuit requires a relatively large amount of space. In a preferred embodiment of the present invention, an application specific integrated circuit ("ASIC") comprising all of the required components is substituted for the discrete circuitry. Because the ASIC requires less space, a second, redundant circuit may be installed within the housing 50 of the present invention. Thus, if the first circuit fails, the second redundant circuit can perform its duties.

Industrial Applicability

The present invention enhances the manufacturability of a potentiometer having a circuit board with resistive elements. The manufacturing processes for a printed circuit board and a circuit board having resistive elements often conflict. Thus, by separating the mother board 46 from the daughter board 48, the two boards may be independently manufactured. Then after the boards are made they are joined in the mother board/daughter board arrangement of the present invention.

A single daughter board having a plurality of resistive elements that each span a different angle allows the daughter board to be used in a plurality of different applications which may require different potentiometer ranges. Likewise, a plurality of resistive elements may be included on a second side of a circuit board to permit the circuit board to be used in a plurality of different applications. Because the single potentiometer can be used in more applications it is possible to produce it in larger numbers and reduce inventory and parts on hand.

We claim:

1. In a device for generating a pulse width modulated signal corresponding to a position of a movable mechanical member, the device having a potentiometer with a movable wiper and a stationary portion, wherein said stationary portion includes a mother board and a daughter board, the device further having a conditioning circuit positioned on the mother board, said conditioning circuit being electrically connected to said daughter board and adapted to produce a pulse-width modulated signal responsive to a position of said movable wiper on said stationary portion, wherein the daughter board comprises:

at least two resistive elements, said conditioning circuit being electrically connected to at least one of said resistive elements.

2. The device according to claim 1, wherein the daughter board includes a conductive element associated with each resistive element, and wherein said conditioning circuit is electrically connected to a conductive element.

3. The device according to claim 1, wherein each of said resistive elements form an arc, each arc having substantially the same radius.

4. The device according to claim 2, wherein each of said resistive elements form an arc, each arc having substantially similar radii.

5. The device according to claim 3, wherein a first resistive element subtends a first arcuate angle, and a second resistive element subtends a second arcuate angle, said second arcuate angle being different from the first arcuate angle.

6. The device according to claim 4, wherein a first resistive element subtends an angle of approximately seventy-two degrees and a second resistive element subtends an angle of approximately one hundred degrees.

7. The device according to claim 5, wherein the movable wiper forms a connection between the first resistive element and the associated conductive element, the range of angles measurable by the potentiometer being a function of the angle spanned by the first resistive element.

8. The device according to claim 5, wherein the second resistive element and associated conductive element are electrically connected to said conditioning circuit, and wherein the movable wiper forms a connection between said second resistive element and associated conductive element, the range of angles measurable by the potentiometer being a function of the angle spanned by said second resistive element.

9. A signal generating apparatus for delivering a pulse-width-modulated signal responsive to the position of a movable mechanical member, comprising:

a circuit board having first and second sides;

a potentiometer having a movable wiper and a stationary portion, said movable wiper being in movable contact with said stationary portion, said movable wiper and said stationary portion being positioned on said circuit board first side and said movable wiper being connected to and movable with said movable mechanical member;

a conditioning circuit being positioned on said circuit board second side, electrically connected to said potentiometer stationary portion and adapted to deliver said pulse-width-modulated signal responsive to the position of said movable wiper on said potentiometer stationary portion; and wherein said stationary potentiometer portion further includes at least two resistive strips, each resistive strip having a conductive strip associated therewith, each of said resistive strips being connectable between a first voltage potential and a second higher voltage potential, each of said conductive strips being connectable to said conditioning circuitry.

10. A signal generating device for delivering a pulse-width-modulated signal responsive to the position of a movable mechanical member, comprising:

a circuit board having a first and a second side;

a potentiometer having a movable wiper and a stationary portion, wherein said stationary portion includes the circuit board second side, said second side including at least two resistive elements and said movable wiper being in movable contact with the stationary portion;

a conditioning circuit positioned on the first side of said circuit board, said conditioning circuit being electrically connected to at least one of said resistive elements and producing a pulse-width-modulated signal responsive to a position of said movable wiper on said stationary portion; and a conductive element associated with each resistive element said conductive element being electrically connected to said conditioning circuit and positioned on said second side of said circuit board.

11. A signal generating device according to claim 10 wherein said movable wiper forms a connection between one of said resistive elements and an associated conductive element at a position where said movable wiper contacts the resistive element.

* * * * *